United States Patent [19]
Hanley

[11] Patent Number: 5,884,177
[45] Date of Patent: *Mar. 16, 1999

[54] CELLULAR COMMUNICATION SYSTEM AND METHOD PROVIDING IMPROVED HANDOFF CAPABILITY

[75] Inventor: Donald V. Hanley, McKinney, Tex.

[73] Assignee: Northern Telecom Limited, Quebec, Canada

[*] Notice: This patent issued on a continued prosecution application filed under 37 CFR 1.53(d), and is subject to the twenty year patent term provisions of 35 U.S.C. 154(a)(2).

[21] Appl. No.: 548,172

[22] Filed: Oct. 25, 1995

[51] Int. Cl.$^6$ ................................................. H04Q 7/22
[52] U.S. Cl. ........................ 455/439; 455/436; 455/437; 455/438; 455/442; 455/422
[58] Field of Search ................................ 379/60, 58, 59, 379/63; 455/33.2, 54.1, 422, 436, 438, 439, 455, 464

[56] References Cited

U.S. PATENT DOCUMENTS

| | | | |
|---|---|---|---|
| 4,608,711 | 8/1986 | Goldman | 455/33 |
| 5,101,501 | 3/1992 | Gilhousen et al. | 455/33 |
| 5,109,528 | 4/1992 | Uddenfeldt | 455/33.2 |
| 5,140,627 | 8/1992 | Dahlin | 379/60 |
| 5,146,609 | 9/1992 | Tayloe et al. | 455/33.2 |
| 5,230,082 | 7/1993 | Ghisler et al. | 379/60 X |
| 5,289,525 | 2/1994 | Issenmann et al. | 379/58 |
| 5,293,380 | 3/1994 | Kondo | 370/95.3 |
| 5,303,289 | 4/1994 | Quinn | 455/33.2 X |
| 5,305,308 | 4/1994 | English | 371/32.1 |
| 5,323,446 | 6/1994 | Kojima et al. | 379/60 |
| 5,327,577 | 7/1994 | Uddenfeldt | 455/33.2 |
| 5,329,635 | 7/1994 | Wadin et al. | 455/33.2 |
| 5,386,456 | 1/1995 | Schatz et al. | 379/60 |
| 5,408,517 | 4/1995 | Nyhart et al. | 379/59 X |
| 5,539,730 | 7/1996 | Dent | 379/280 |
| 5,555,257 | 9/1996 | Dent | 379/58 X |
| 5,625,876 | 4/1997 | Gilhousen et al. | 455/101 X |
| 5,649,000 | 7/1997 | Lee et al. | 455/436 |
| 5,680,395 | 10/1997 | Weaver, Jr. et al. | 455/436 X |
| 5,732,352 | 3/1998 | Gutowski et al. | 455/502 X |
| 5,737,705 | 4/1998 | Ruppel et al. | 455/63 X |

FOREIGN PATENT DOCUMENTS

WO 95/08899  3/1995  WIPO ................................. 455/442

OTHER PUBLICATIONS

Neil J. Boucher, The Cellular Radio Handbook, 1990, chapter 10, pp. 137–151.

*Primary Examiner*—David R. Hudspeth
*Assistant Examiner*—Daniel Abebe
*Attorney, Agent, or Firm*—Finnegan, Henderson, Farabow, Garrett & Dunner, L.L.P.

[57] ABSTRACT

A cellular communication system and method providing improved handoff capability which reduces muting during handoffs. During handoffs, the system simultaneously monitors received signals from both the serving cellsite on a first channel and the target cellsite on a second channel and outputs the received signal containing an information signal. Additionally, the system simultaneously transmits an information signal to a mobile unit via the serving cellsite on a first channel and via the target cellsite on a second channel.

25 Claims, 5 Drawing Sheets

CELLULAR COMMUNICATION SYSTEM AND METHOD PROVIDING IMPROVED HANDOFF CAPABILITY

BACKGROUND OF THE INVENTION

The present invention relates to cellular communication systems. More particularly, the present invention relates to a cellular communication system providing improved handoffs between cellsites.

Conventional cellular telephone systems provide radio communications over a service area using an allocated frequency band divided into radio channels. The service area is divided geographically into cells. Each cell contains an associated cellsite providing radio communications for the cell. The cellsites include, inter alia, a radio transmitter and a radio receiver for establishing radio communications with a mobile telephone. Each cellsite is coupled to a system controller, such as a mobile telephone switching office (MTSO), either directly or through a base station (cellsite) controller.

In conventional cellular telephone systems, handoffs allow a call to continue as a mobile telephone crosses the boundary between two cells. FIG. 1 illustrates the sequence of a conventional handoff. For purposes of simplicity, it is assumed that the cellsites are connected directly to the MTSO. It is understood, however, that an analogous handoff sequence would apply in systems employing base station controllers.

Referring to FIG. 1, a handoff from one cellsite to another is initiated when the cellsite handling the call (the serving cellsite) determines that the received signal strength from the mobile telephone falls below a predetermined threshold value. (Step 105). A low signal strength indication implies that the mobile telephone is near the cell's border. When the signal level falls below the predetermined threshold value, the serving cellsite sends a handoff request to the MTSO. (Step 110).

In response, the MTSO sends "locate measurement requests" (Step 115) to the serving cellsite and its neighboring cellsites to determine which cellsite receives the mobile telephone's signal with the best signal strength. In response, the neighboring cellsites employ scanning receivers to determine the signal strength from the mobile telephone on the specified channel. The neighboring cellsites, as well as the serving cellsite, send "locate measurement responses" to the MTSO. (Step 120). If one of the neighboring cellsites reports a better signal level to the MTSO, a handoff to that cellsite (the target cellsite) will be attempted.

To attempt a handoff, the MTSO sends a new channel setup request to the target cellsite. (Step 125). In response, the target cellsite acknowledges the new channel set up request indicating that the new channel is ready to receive the mobile telephone. (Step 130). The MTSO then initiates handoff by sending a handoff order to the serving cellsite. (Step 135). The serving cellsite, in response, sends a handoff order to the mobile telephone commanding it to switch from the current channel to the new channel. (Step 140). The mobile telephone then sends a handoff order acknowledgment to the serving cellsite. (Step 145). The serving cellsite sends an acknowledgment to the MTSO (Step 150) and, upon receiving the acknowledgment, the MTSO switches the call from the serving cellsite to the target cellsite and releases the old channel (Step 152).

Meanwhile, after the mobile telephone sends the handoff order acknowledgment (Step 145), it switches to the second channel. Upon arriving, the mobile telephone sends a "mobile on channel" signal to the target cellsite (Step 155), which in turn, sends a "mobile on channel" signal to the MTSO (Step 160). If the MTSO did not previously receive the handoff order acknowledgment (e.g., because of fading or distortion), the MTSO switches the call from the serving cellsite to the target cellsite and releases the old channel (Step 152) upon receiving the "mobile on channel" signal.

During portions of the handoff sequence described in FIG. 1, system users experience periods of muting while their call is handed off from the serving cellsite to the target cellsite. As system operators reconfigure their systems to meet increasing demand by shrinking cells, instituting sectorization, and deploying microcells, the frequency of handoffs and resultant muting increases, especially in densely populated areas. Communications can significantly denigrate depending on the duration of the muting. For example, in communications involving data transfer, interruptions caused by muting can affect reliability, forcing some mobile users to employ special modem equipment to ensure data integrity. Moreover, even in ordinary conversations, gaps of over 250 milliseconds are generally noticeable to most subscribers.

In a conventional handoff, a mobile telephone's speech is muted from the time the mobile telephone receives a handoff order (Step 140) until the mobile telephone finishes transmitting a "mobile on channel" signal (Step 155). The duration of this muting ranges from about 100 milliseconds in Time Division Multiple Access (TDMA) systems up to about 250 milliseconds in Advanced Mobile Telephone (AMPS) systems. Because this period is determined by characteristics of the mobile telephone itself (e.g., the radio interface standard employed and speed of the frequency synthesizer), little can be done to shorten this period without using special mobile equipment.

On the switch side, speech is muted from the time the mobile telephone receives a handoff order (Step 140) until the mobile telephone finishes transmitting a "mobile on channel" signal (Step 155) or the network path is switched in response to a handoff order acknowledgment (Step 150), whichever is later. If the MTSO receives no handoff acknowledgment (e.g., because of fading or distortion), speech is muted until the network path is switched in response to the "mobile on channel" signal or an indication from the old channel that the mobile is no longer present, whichever is later. If the mobile arrives on the new channel before the network path is switched, the muting period imposed by the mobile telephone itself may be extended by 150 milliseconds or more.

U.S. Pat. No. 5,101,501 to Gihousen et al., assigned to Qualcomm Incorporated, describes a Code Division Multiple Access (CDMA) cellular system capable of reducing certain muting during handoffs by using a "soft handoff" technique. According to this technique, the serving and target cellsites monitor the same frame of the same channel and, on a frame-by-frame basis, a selector evaluates both frames and chooses the frame with the highest quality. This is possible in a CDMA system because adjacent cellsites can use the same radio channel and thus simultaneously monitor the same transmission of a mobile telephone. Likewise, in the reverse direction, both the serving and target cellsites simultaneously transmit to the mobile telephone. Although this soft handoff technique is effective in reducing certain muting during handoffs, it relies on CDMA infrastructure and coding, and is unworkable in existing AMPS and TDMA systems.

U.S. Pat. Nos. 5,327,577 and 5,109,528 to Uddenfelt, assigned to Telefonaktiebolaget L. M. Ericsson, are directed to handoff techniques which reduce muting in a cellular communication systems. The systems of these patents, however, rely in large part on an adaptive channel allocation system wherein at least some radio channels are common to neighboring cellsites. Thus, like the CDMA system, these techniques are generally incompatible with existing AMPS and TDMA systems.

To diminish muting problems, some existing AMPS systems use conference bridges which combine speech via the target and source cellsites during handoffs. While reducing muting due to lost handoff acknowledgments, the action of switching the conference bridge into and out of the call, in itself, breaks the network path causing brief muting before and after the handoff. Moreover, conferences bridges are generally suitable only for AMPS systems since they do not support coded speech, such as Vector Sum Excited Linear Prediction (VSELP) coding used in TDMA systems. Conference bridges also represent a significant investment of specialized equipment, and must be engineered to support peaks of handoff activity without lowering the grade of service to mobile subscribers.

Accordingly, there remains a need for a cellular communication system and method providing improved handoff capability that reduces muting during handoffs between cellsites and is compatible with existing cellular telephone systems and standards, without incurring the drawbacks associated with conference bridges.

SUMMARY OF THE INVENTION

Accordingly, the present invention is directed to a cellular communication system and method providing improved handoff capability that substantially obviates one or more of the problems due to limitations and disadvantages of the prior art.

It is an object of the present invention to provide a cellular communication system and method that reduces muting experienced by users during handoffs between cellsites.

It is a further object of the present invention to provide a cellular communication system and method providing improved handoff capability that is compatible with existing cellular telephone systems and standards, including AMPS and TDMA systems.

It is also an object of the present invention to provide a cellular communication system and method that minimizes breaks in network paths during handoffs between cellsites.

It is another object of the present invention to provide a cellular communication system and method that reduces the need for special modem equipment for mobile data transmissions.

It is yet another object of the present invention to provide a cellular communication system and method providing improved handoff capability without incurring the costs and risks of deploying CDMA technology.

Additional objects and advantages of the invention will be set forth in part in the description which follows, and in part will be obvious from the description or may be learned by practice of the invention. The objects and advantages of the invention will be realized and attained by means of the elements, method steps, and combinations particularly pointed out in the appended claims.

To achieve the objects and in accordance with the purpose of the invention, as embodied and broadly described herein, the invention comprises a method of handing off communications between a mobile unit and another unit from a serving cellsite on a first channel to a target cellsites on a second channel in a cellular communication system wherein the mobile unit is communicating a first information signal to the other unit and the other unit is communicating a second information signal to the mobile unit. The method includes the step of simultaneously monitoring a first received signal from the serving cellsite on the first channel and a second received signal from the target cellsite on the second channel, and transmitting a selected signal to the other unit. The selected signal comprises either the first or second received signals.

The method further includes the steps of sending a handoff order to the mobile unit via the serving cellsite on the first channel to switch to the second channel, and receiving a "mobile on channel" signal from the mobile unit via the target cellsite on the second channel. In response to the "mobile on channel" signal, the monitoring step, selecting step, and transmitting a selected signal step are terminated, and the second received signal is transmitted to the other unit.

Furthermore, as embodied and broadly described herein, the invention comprises a cellular communication system for communicating information signals between a mobile unit and another unit coupled to said system using an allocated frequency band divided into radio channels. The system includes a system controller, a plurality of cellsites connected to said system controller, and means for handing off communications between the mobile unit and the other unit from a serving cellsites on a first channels to a target cellsites on a second channels. The handoff means includes means for simultaneously monitoring a first received signal from the serving cellsite on the first channel and a second received signal from the target cellsite on the second channel and means for transmitting a selected signal to the other unit. The selected signal comprises either the first or second received signals.

Both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
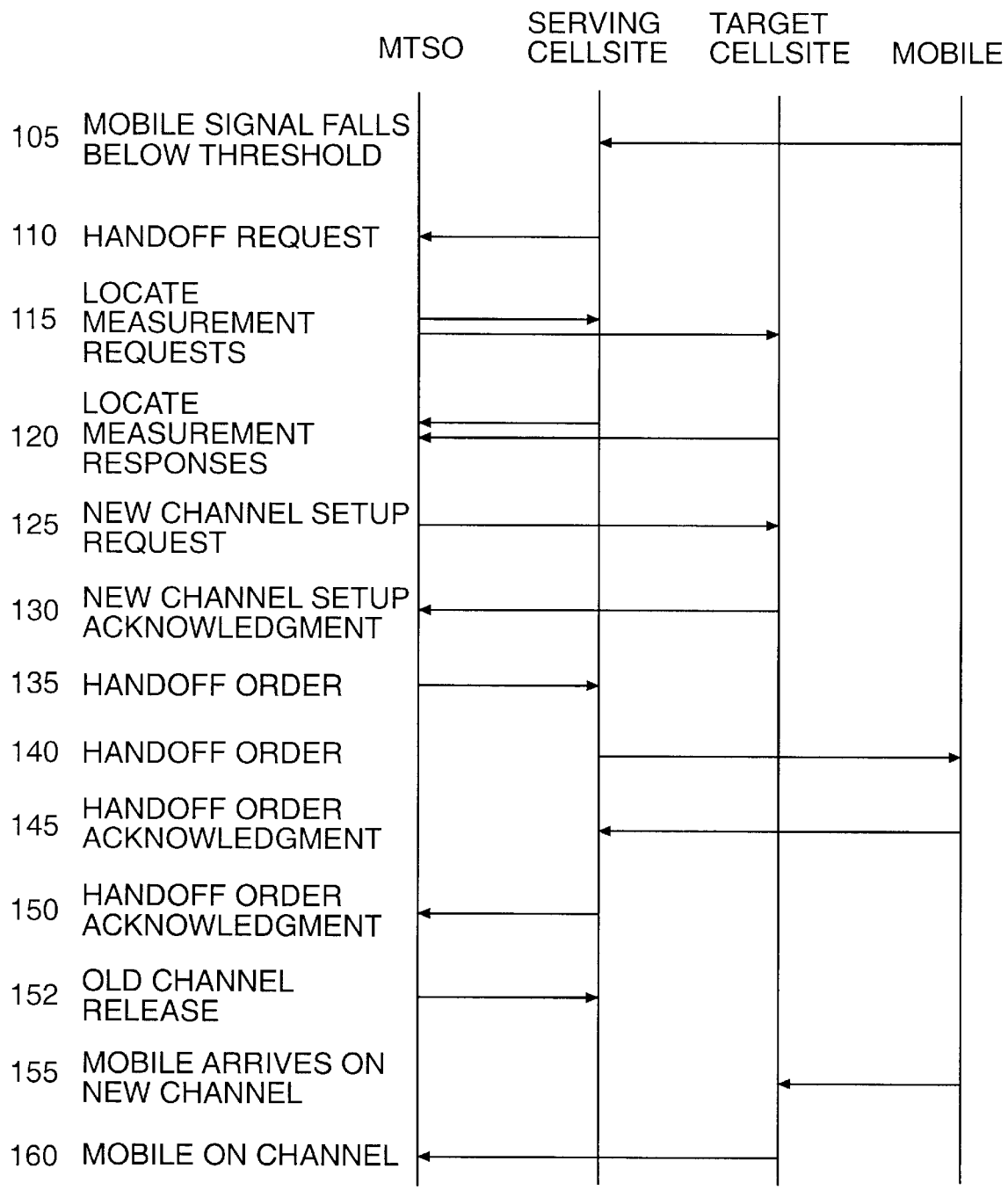
FIG. 1 is a diagram illustrating the sequence of a conventional handoff.
Figure 2:
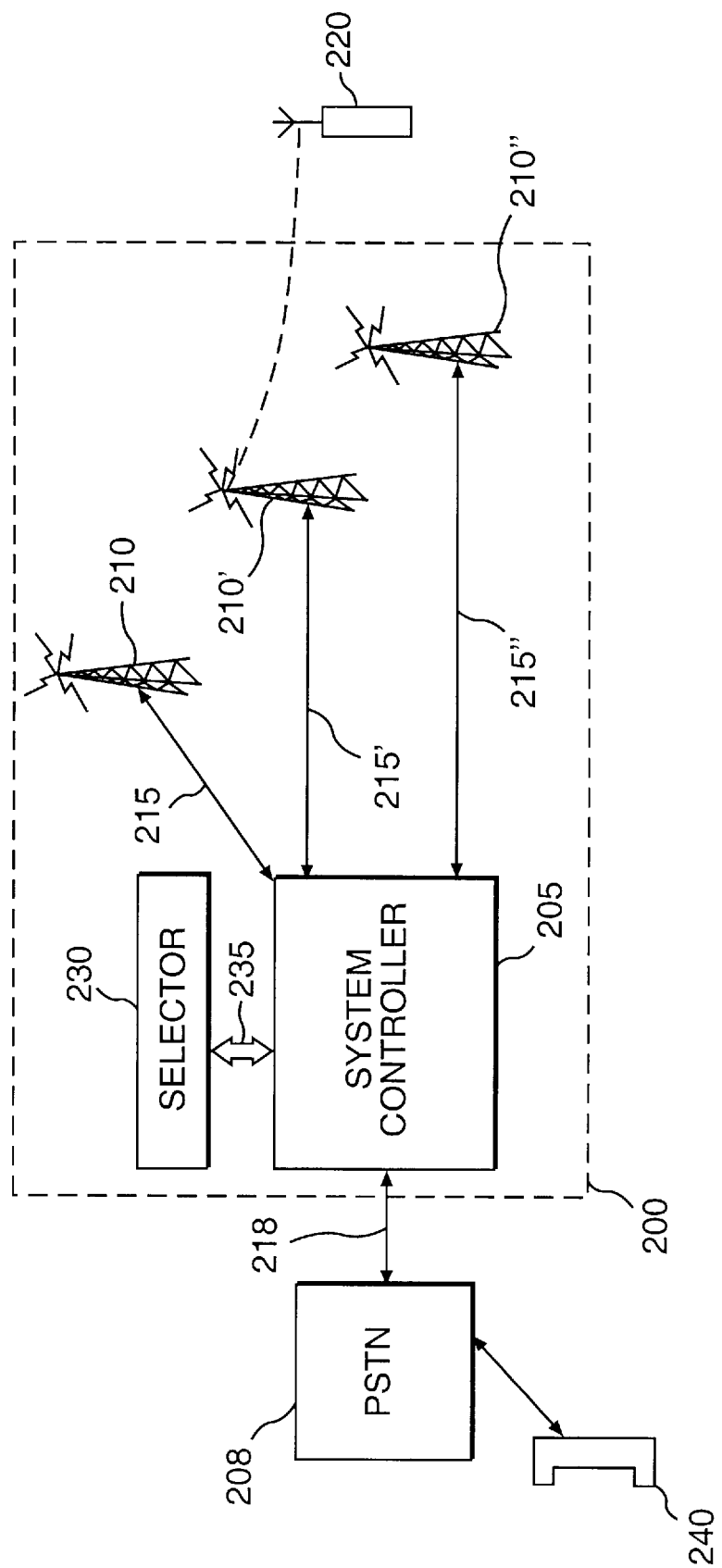
FIG. 2 is a block diagram illustrating the communication system of the present invention.

The communication system of the present invention is shown in FIG. 2 and is designated generally by reference numeral 200. Communication system 200 provides radio communications over a service area using an allocated frequency band divided into radio channels. Preferably, communication system 200 uses standards and conventions of a standard AMPS or TDMA cellular system. For example, under the AMPS standard, a bandwidth of 25 MHz is divided into 832 frequency channels of 30 kHz bandwidth. Many of the details of communication system 200 are well known in art and are not specifically pertinent to the present invention. Therefore, some such details have been omitted for purposes of clarity.

As embodied herein and referring to FIG. 2, communication system 200 includes a system controller 205 for connecting to a public switch telephone network (PSTN) 208. Communication system 200 further includes a plurality of geographically spaced cellsites 210. Each cellsite 210 is assigned a set of frequency channels. The channels are assigned to cellsites 210 in such a way as to minimize the possibility of co-channel interference. Thus, a channel used in one cellsite 210 will not typically be used in neighboring cellsites or any other cellsites with transmission characteristics that might create co-channel interference. In a typical application, system 200 would include a large number of cellsites 210. Because system operation is essentially the same with few or many cellsites, however, this description references three cellsites 210.

Each cellsite 210 includes radio transmitting and receiving equipment (not shown) for establishing radio communications with a mobile unit 220. Cellsites 210 are connected to system controller 205 via data transmission system 215 which may be, for example, a microwave link, optical fibers, or wires, as are known in the art. Likewise, system controller 205 is connected to PSTN 208 via data transmission system 218.

As shown in FIG. 2, system controller 205 is connected directly to cellsites 210. Alternatively, system controller 205 is connected to cellsites 210 via one or more base station controllers (not shown). The configuration is further described in U.S. patent application of Donald V. Hanley and Jerry J. Parker, entitled "System and Method for Providing Cellular Communication Services Using a Transcoder," filed on the same date herewith, and which is incorporated herein by reference. System controller 205 is preferably an MTSO, mobile telephone switching center (MTSC), or mobile telephone exchange (MTX), as are known in the art. For example, system controller 205 may comprise a DMS-MTX system controller, as is commercially available from Northern Telecom, Ltd.

Figure 3:
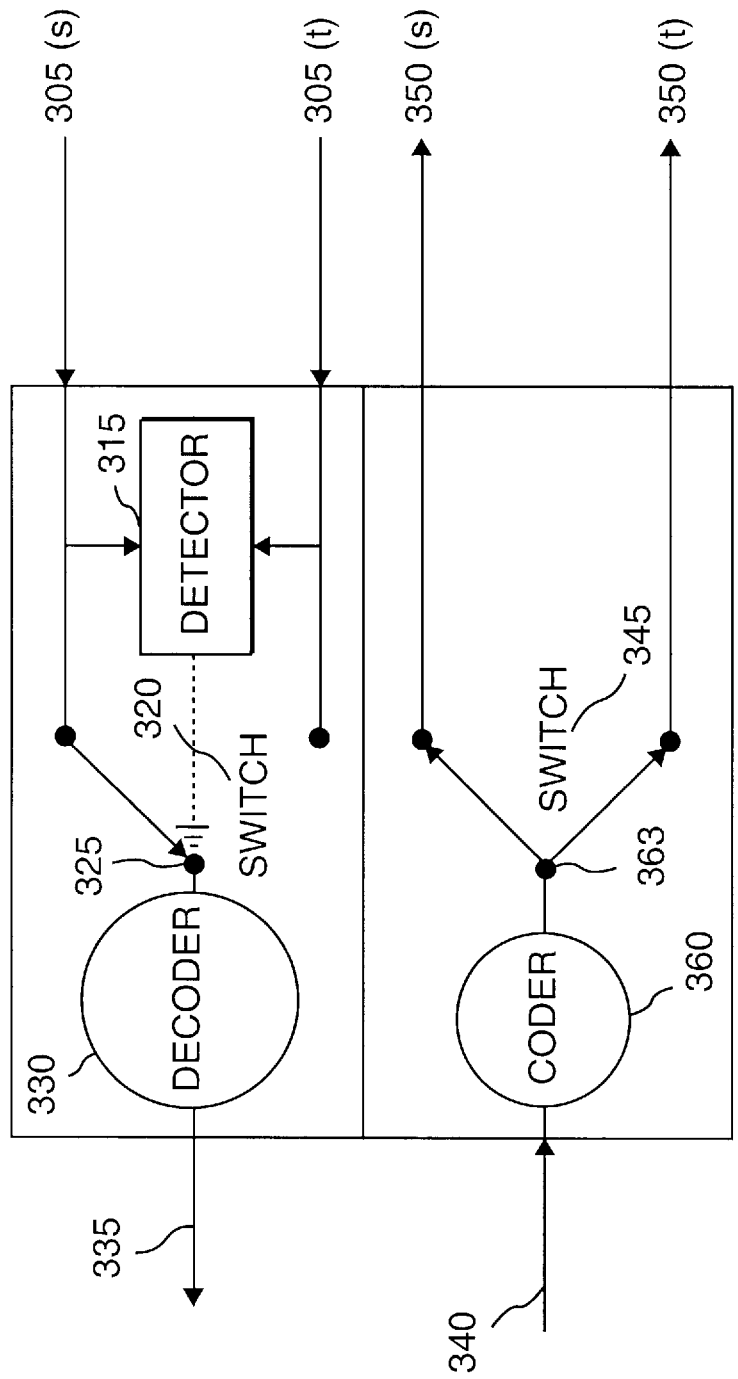
FIG. 3 is a block diagram illustrating the selector of the communication system illustrated in FIG. 2.

Communication system 200 of the present invention also includes a selector 230. Selector 230 is coupled to system controller 205 via a connection 235. Selector 230 is further illustrated in FIG. 3. As shown in FIG. 3, selector 230 includes a detector 315 which controls operation of a switch 320. A switch output 325 is connected to a decoder 330 for converting a radio signal input via switch output 325 to a pulse code modulation (PCM) signal that is output from decoder 330 via a connection 335. For example, where communication system 200 of the present invention employs adaptive differential PCM (ADPCM), decoder 330 converts an ADPCM signal to a PCM signal. Where communication system 200 employs a TDMA standard, decoder 330 converts VSELP coding to PCM. Alternatively, where communication system 200 employs a standard which generates PCM directly (e.g., conventional AMPS signaling), selector 230 includes no decoder.

Detector 315 monitors two signals input to selector 230 via connections 305(s) and 305(t). For AMPS systems, detector 315 is adapted to continually select the signal with the highest level of speech energy using Voice Activity Detection (VAD) or any similar technique, as is known in the art. For TDMA systems, detector 315 selects, on a frame-by-frame basis, the best speech sample to send to decoder 330. Detector 315 controls switch 320 so that the selected channel is output from connection 335 via switch output 325 and decoder 330. Because neighboring cellsites 210 of the present invention do not use common channels, and because mobile unit 220 does not simultaneously transmit on multiple channels, speech signals will not normally be present on both connections 305(s) and 305(t) at the same time. Thus, in typical operation, detector 315 selects between a signal containing speech and a null signal or signal containing noise or distortion.

Selector 230 further includes a connection 340 to a coder 360 for converting a signal input via connection 340 to the standard adopted for communication system 200. The coded signal is output to switch input 363. For example, where communication system 200 of the present invention employs a ADPCM standard, coder 360 converts a PCM signal to an ADPCM signal. Where communication system 200 employs a TDMA standard, coder 360 converts a PCM signal to a VSELP signal. Alternatively, where communication system 200 employs a standard which uses PCM directly (e.g., conventional AMPS signaling), no coder is included in selector 230. Selector 230 further includes a switch 363 for connecting switch input 363 to one or both of connections 350(s) and 350(t). Alternatively, switch 363 continuously connects switch input 363 to both of connections 350(s) and 350(t). Switch 363 is controlled by system controller 205 via connection 235. Connections 305(s), 305(t), 335, 340, 350(s), and 350(t) of selector 230 are coupled to system controller 205 via connection 235.

In normal operation of communication system 200 (i.e., when system 200 is not attempting a handoff), mobile unit 220 communicates information signals (i.e., signals carrying recognizable or usable information) with another unit 240 via one of the cellsites 210 designated as cellsite 210'. Cellsite 210' is known as the serving cellsite. The other unit 240 may be a landline user connected to system 200 via PSTN 208. Alternatively, the other unit 240 may be another mobile unit connected to system 200 via one of the cellsites 210. Communications between mobile unit 220 and the other unit 240 occur with mobile unit 220 using a first radio channel of the set assigned to serving cellsite 210'.

Communications between mobile unit 220 and the other unit 240 are bi-directional. Thus, mobile unit 220 communicates a first information signal to the other unit 240 while the other unit 240 simultaneously communicates a second information signal to mobile unit 220. At times, however, one or both of the first and second information signals may contain silence or a null signal. First and second information signals may comprise speech, information, or any type of data.

The first information signal is transmitted by mobile unit 220 over the first radio channel to cellsite 210' which transmits the first information signal to system controller 205 via data transmission system 215'. System controller 205 connects the received signal from serving cellsite 210'

(the first received signal) to connection 305(s) of selector 230. In normal operation of system 200, the first received signal is the first information signal. Moreover, in normal operation, switch 320 is set to constantly connect connector 305(s) to switch output 325 irrespective of detector 315. Thus, decoder 330 decodes the first information signal and outputs it as a PCM signal at connection 335. Connection 335 is coupled to the other unit 240 via system controller 205 and PSTN 208.

The second information signal is transmitted from the other unit 240 to system controller 205 via PSTN 208 and transmission system 218. System controller 205 connects the second information signal to connection 340 of selector 230. Coder 360 codes second information signal and outputs it as a coded signal to switch input 363. In normal operation of system 200, switch 345 is set such that the second information signal is constantly output via connection 350(s), not via connection 350(t). Connection 350(s) is coupled to cellsite 210' via system controller 205 and data transmission system 215'. Cellsite 210' transmits the second information signal on the first channel to mobile unit 220.

Figure 5:
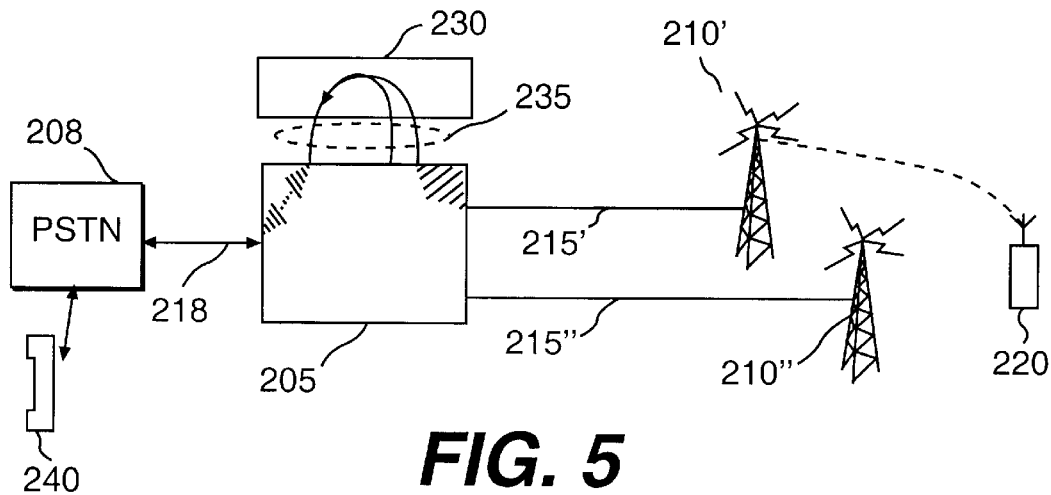
FIG. 5 illustrates communication links established during normal operation of the system 200 illustrated in FIG. 2.

FIG. 5 illustrates communication links established during normal operation of system 200. A bi-directional communication link is established between mobile unit 220 and the other unit 240 via PSTN 208, connection 218, system controller 205, connection 235, selector 230, data transmission system 215', and serving cellsite 210' using the first channel.

Figure 4:
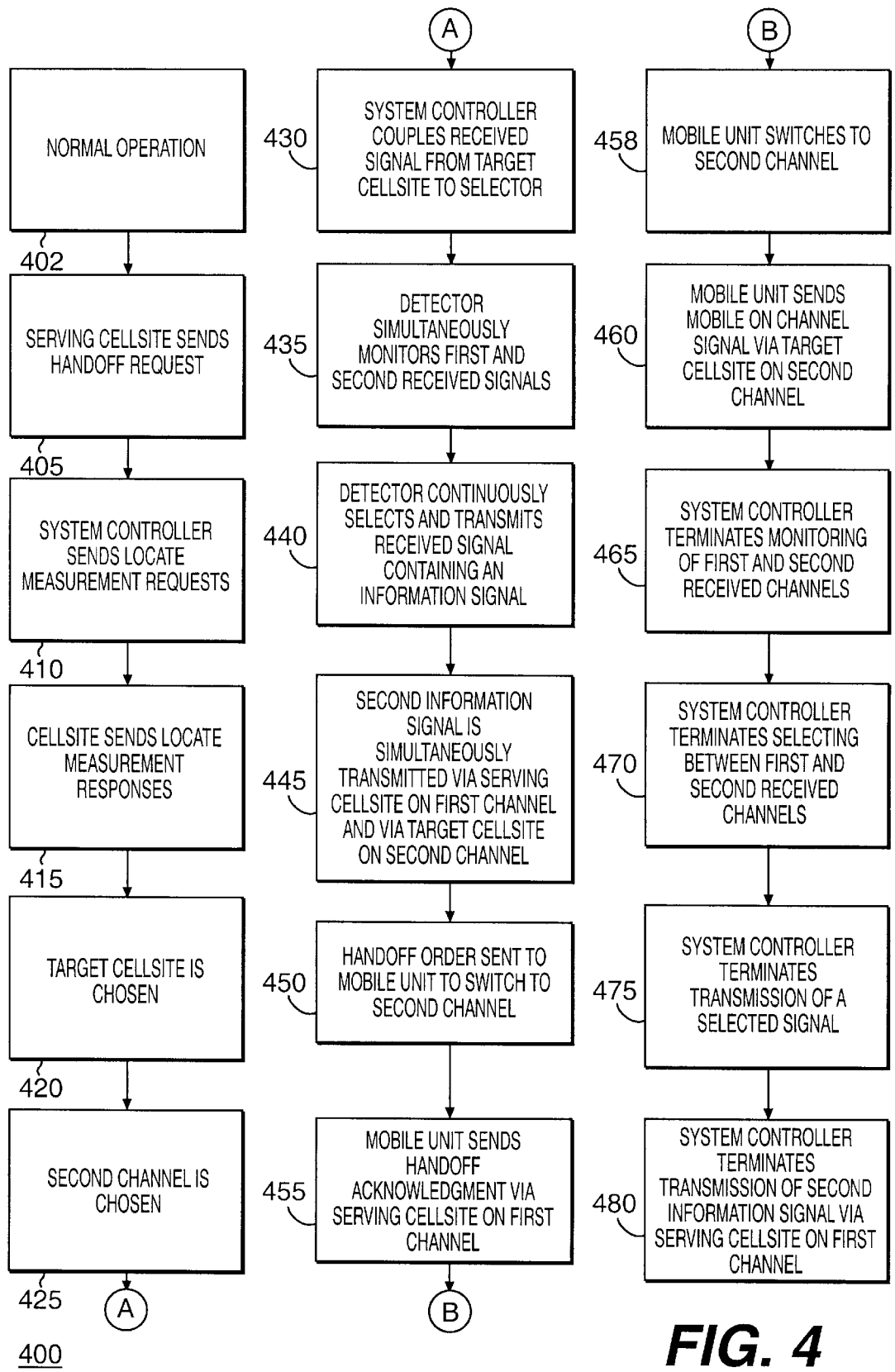
FIG. 4 is a flowchart illustrating the handoff method of the present invention.

During normal operation, if serving cellsite 210' determines that the received signal strength from mobile unit 220 falls below a predetermined threshold value, a handoff is initiated and the above-described normal operation of system 200 is altered as follows. A flowchart illustrating the handoff method of the present invention is shown in FIG. 4. The preferred handoff method is designated generally as 400.

In handoff method 400, system 200 begins in normal operation. (Step 402). When the received signal level from mobile unit 220 falls below the predetermined threshold value, serving cellsite 210' sends a handoff request to system controller 205. (Step 405). In response, system controller 205 sends "locate measurement requests" to serving cellsite 210' and other cellsites 210 neighboring serving cellsite 210' to determine which cellsite 210 receives the mobile unit's signal with the best signal strength. (Step 410).

In response, neighboring cellsites 210 employ scanning receivers to determine the signal strength from mobile unit 220 on the first channel. Neighboring cellsites 210, as well as serving cellsite 210', send "locate measurement responses" to system controller 205. (Step 415). If one of the neighboring cellsites 210 reports a better signal level to the system controller 205, that cellsite is chosen as the target cellsite, designated as cellsite 210", to which the handoff will be attempted. (Step 420). A second channel is then chosen from the idle channels of the set used by target cellsite 210". (Step 425).

Once target cellsite 210" and the second channel are determined, system controller 205 couples the received signal from the target cellsite 210" on the second channel (the second received signal) to connection 305(t) of selector 230. (Step 430). System controller 205 sets switch 320 such that detector 315 simultaneously monitors the first and second received signals (Step 435) and continually selects the received signal containing an information signal, causing the selected signal to be connected to switch output 325 and transmitted to the other unit 240 via connection 235, system controller 205, connection 218, and PSTN 208. (Step 440).

System controller 205 also sets switch 345 such that second information signal is simultaneously output via connections 350(s) and 350(t). Connection 350(t) is coupled to target cellsite 210" via connection 235, system controller 205, and data transmission system 215". Cellsite 210' transmits the second information signal on the second channel to mobile unit 220. Thus, the second information signal is simultaneously transmitted via serving cellsite 210' on the first channel and via target cellsite 210" on the second channel. (Step 445).

Figure 6:
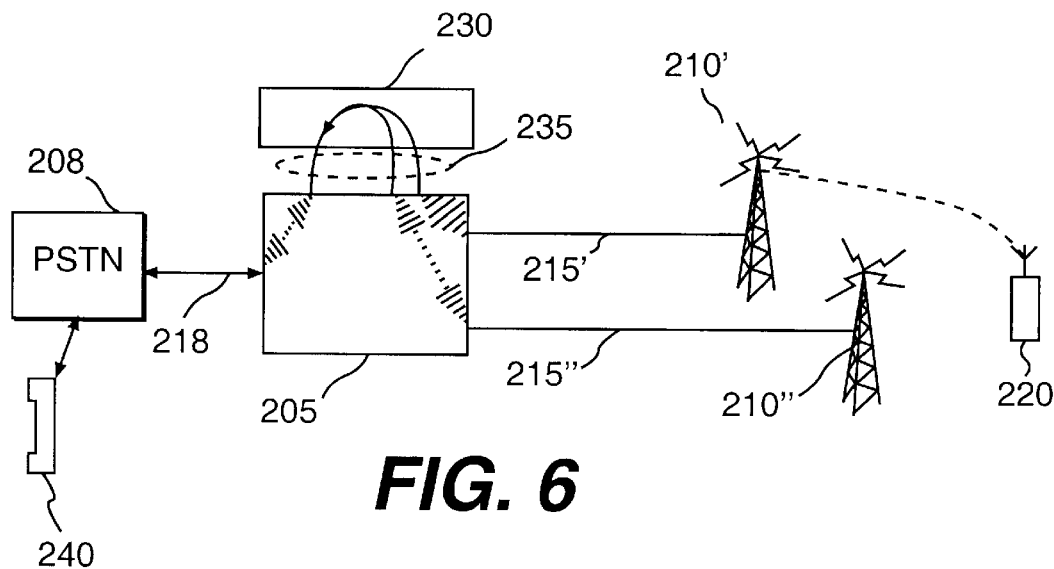
FIG. 6 illustrates communication links established after step 445 of the handoff method illustrated in FIG. 4.

FIG. 6 illustrates communication links established after step 445 of handoff method 400. A bi-directional communication link is established between mobile unit 220 and the other unit 240 via PSTN 208, connection 218, system controller 205, connection 235, selector 230, data transmission system 215', and serving cellsite 210' using the first channel. A bi-directional communication link is also established between the second channel and the other unit 240 via PSTN 208, connection 218, system controller 205, connection 235, selector 230, data transmission means 215", and target cellsite 210". Because mobile unit 220 does not simultaneously transmit signals on multiple channels or simultaneously receive signals on multiple channels, however, communications will not actually occur over both established links at the same time.

Referring back to FIG. 4, system controller 205 then sends a handoff order to serving cellsite 210' which, in turn, sends a handoff order to mobile unit 220 on said first channel to switch to said second channel. (Step 450). In response, mobile unit 220 sends a handoff acknowledgment on the first channel. (Step 455). This acknowledge is received by system controller 205 via serving cellsite 210' on said first channel. Mobile unit 220 then switches to the second channel (Step 458) and sends a "mobile on channel" signal to system controller 205 via target cellsite 210" on the second channel. (Step 460).

In response to the "mobile on channel" signal, system controller 205 sets switch 320 to connect connector 305(t) to switch output 325 irrespective of detector 315, and sets switch 345 such that the second information signal is output via connection 350(t), but not connection 350(s). Thus, system controller 205 terminates monitoring the first and second received signals (Step 465), terminates selecting between the first and second received signals (Step 470), and terminates transmitting a selected signal step (Step 475). Moreover, system controller 205 terminates simultaneous transmission of the second information signal via both serving cellsite 210' on the first channel and target cellsite 210" on the second channel. (Step 480).

Figure 7:
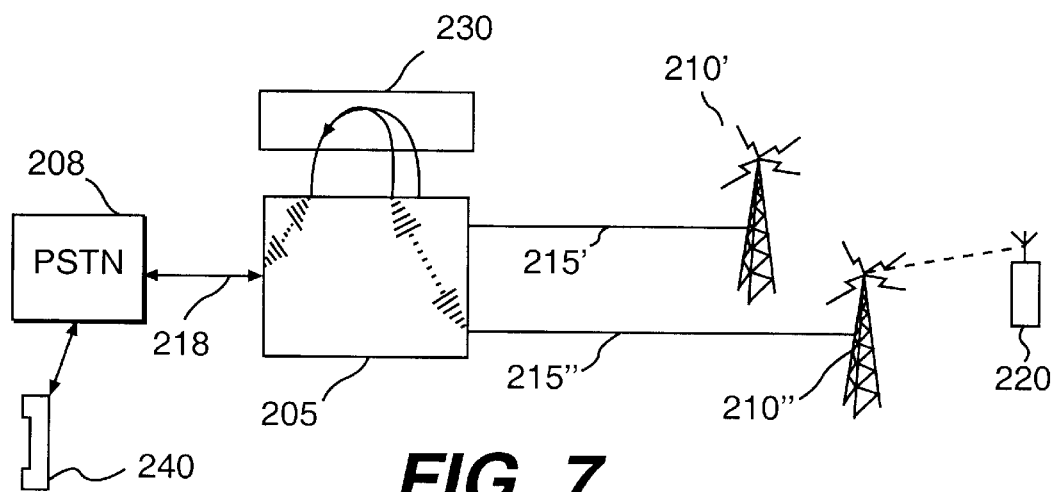
FIG. 7 illustrates communication links established after completion of the handoff method illustrated in FIG. 4.

FIG. 7 illustrates communication links established after completion of handoff method 400. A bi-directional communication link is established between mobile unit 220 and the other unit 240 via PSTN 208, connection 218, system controller 205, connection 235, selector 230, data transmission system 215" and target cellsite 210" using the second channel.

Referring back to FIG. 4, at this point, system 200 has completed the handoff and is again operating normally (Step 402). The only difference is that cellsite 210" is now acting as the serving cellsite and connections 305(s) and 305(t) and connections 350(s) and 350(t) are reversed in designation.

It will be apparent to those skilled in the art that various modifications and variations can be made in the computer system and method of the present invention without departing from the scope or spirit of the invention. Moreover, other embodiments of the invention will be apparent to those skilled in the art from consideration of the specification and practice of the disclosed invention herein. The specification and examples are thus only exemplary, with the true scope and spirit of the invention being indicated by the following claims.

What is claimed is:

1. In a cellular communication system comprising a system controller and a plurality of cellsites coupled to said system controller, wherein a mobile unit and another unit communicate information signals via a serving one of said cellsites on a first channel, said mobile unit communicating a first information signal to said other unit and said other unit communicating a second information signal to said mobile unit, a method of handing off communications between said mobile unit and said other unit from said serving cellsite on said first channel to a target one of said cellsites on a second channel comprising the steps of:

simultaneously monitoring a first received signal from said serving cellsite on said first channel and a second received signal from said target cellsite on said second channel;

selecting, at the system controller, between said first received signal from said serving cellsite and said second received signal from said target cellsite;

transmitting the selected signaled to said other unit, said selected signal comprises said first received signal if the level of speech energy of said first received signal is greater than the level of speech energy of said second received signal or said second received signal if the level of speech energy of said second received signal is greater than the level of speech energy of said first received signal;

sending a handoff order to said mobile unit via said serving cellsite on said first channel to switch to said second channel;

receiving a "mobile on channel" signal from said mobile unit via said target cellsite on said second channel; and terminating said monitoring step, said selecting step, and said transmitting the selected signal step, and transmitting said second received signal to said other unit, in response to said "mobile on channel" signal.

2. The method of claim 1, further comprising the steps of:

simultaneously transmitting said second information signal via said serving cellsite on said first channel and via said target cellsite on said second channel prior to sending said handoff order; and terminating said simultaneous transmission step and transmitting said second information signal via said target cellsite on said second channel in response to said "mobile on channel" signal.

3. The method of claim 2, wherein said second channel is different than said first channel.

4. The method of claim 3, said method further comprising the steps of:

receiving a handoff request from said serving cellsite communicating with said mobile telephone on said first channel; and selecting said target cellsite from said plurality of cellsites in response to said handoff request.

5. The method of claim 4, wherein said cellular communication system uses an AMPS communication standard.

6. The method of claim 5, wherein said first and second information signals comprise PCM coded speech.

7. The method of claim 5, wherein said first and second information signals comprise PCM coded data.

8. The method of claim 4, wherein said cellular communication system uses an TDMA communication standard.

9. The method of claim 8, wherein said first and second information signals comprise VSELP coded speech.

10. The method of claim 8, wherein said first and second information signals comprise VSELP coded data.

11. The method of claim 1, wherein the simultaneously monitoring step and the transmitting step occur at the system controller.

12. In an AMPS cellular communication system comprising a system controller and a plurality of cellsites coupled to said system controller, wherein a mobile unit and another unit communicate PCM coded speech signals via a serving one of said cellsites on a first channel, said mobile unit communicating a first information signal to said other unit and said other unit communicating a second information signal to said mobile unit, a method of handing off communications between said mobile unit and said other unit from said serving cellsite on said first channel to a target one of said cellsites on a second channel different than said first channel comprising the steps of:

receiving a handoff request from said serving cellsite communicating with said mobile unit on said first channel;

selecting said target cellsite from said plurality of cellsites in response to said handoff request;

simultaneously transmitting said second information signal via said serving cellsite on said first channel and via said target cellsite on said second channel;

simultaneously monitoring a first received signal from said serving cellsite on said first channel and a second received signal from said target cellsite on said second channel;

selecting, at the system controller, between said first received signal from said serving cellsite and said second received signal from said target cellsite;

transmitting the selected signal to said other unit, said selected signal comprising said first received signal if the level of speech energy of said first received signal is greater than the level of speech energy of said second received signal or said second received signal if the level of speech energy of said second received signal is greater than the level of speech energy of said first received signal;

sending a handoff order to said mobile unit via said serving cellsite on said first channel to switch to said second channel;

receiving a "mobile on channel" signal from said mobile unit via said target cellsite on said second channel; and terminating said simultaneous transmission step, said monitoring step, said selecting step, and said transmitting a selected signal step, transmitting said second information signal via said target cellsite on said second channel, and transmitting said second received signal to said other unit in response to said "mobile on channel" signal.

13. A cellular communication system for providing communicating information signals between a mobile unit and another unit coupled to said system using an allocated frequency band divided into radio channels, comprising:

a system controller;

a plurality of cellsites connected to said system controller; and means for handing off communications between said mobile unit and said other unit from a serving one of said cellsites on a first one of said channels to a target one of said cellsites on a second one of said channels, said handoff means including means for simultaneously monitoring a first received signal from said serving cellsite on said first channel and a second received signal from said target cellsite on said second channel, and means for transmitting a selected signal to said other unit, said selected signal comprising one of the group of said first and second received signals, and wherein said selected signal comprises said first received signal if the level of speech energy of said first received signal is greater than the level of speech energy of said second received signal or said second received signal if the level of speech energy of said second received signal is greater than the level of speech energy of said first received signal.

14. The communication system of claim 13, wherein said handoff means further includes means for simultaneously transmitting a second information signal communicated from said other unit via said serving cellsite on said first channel and via said target cellsite on said second channel.

15. The communication system of claim 13, wherein said second channel is different than said first channel.

16. The communication system of claim 15, wherein said system uses an AMPS communication standard.

17. The communication system of claim 15, wherein said system uses an TDMA communication standard.

18. A cellular communication system comprising a system controller and a plurality of cellsites coupled to said system controller, wherein a mobile unit and another unit communicate PCM coded speech signals via a serving one of said cellsites on a first channel, said mobile unit communicating a first information signal to said other unit and said other unit communicating a second information signal to said mobile unit, said system comprising:

means for handing off communications between said mobile unit and said other unit from said serving cellsite on said first channel to a target one of said cellsites on a second channel different than said first channel, said handing off means including:

means for simultaneously transmitting said second information signal via said serving cellsite on said first channel and via said target cellsite on said second channel;

means for simultaneously monitoring a first received signal from said serving cellsite on said first channel and a second received signal from said target cellsite on said second channel;

means, at the system controller, for selecting between said first received signal from said serving cellsite and said second received signal from said target cellsite;

means for transmitting the selected signal to said other unit, said selected signal comprising said first received signal if the level of speech energy of said first received signal is greater than the level of speech energy of said second received signal or said second received signal if the level of speech energy of said second received signal is greater than the level of speech energy of said first received signal.

19. In a cellular communication system for providing communicating information signals between a mobile unit and another unit coupled to said system using an allocated frequency band divided into radio channels, a system controller comprising:

means for handing off communications between said mobile unit and said other unit from a serving one of said cellsites on a first one of said channels to a target one of said cellsites on a second one of said channels, said handoff means including means for simultaneously monitoring a first received signal from said serving cellsite on said first channel and a second received signal from said target cellsite on said second channel;

means for selecting between said first received signal from said serving cellsite and said second received signal from said target cellsite; and means for transmitting the selected signal to said other unit, said selected signal comprising one of the group of said first received signals if the level of speech energy of said first received signal is greater than the level of speech energy of said second received signal or one of the group of said second received signals if the level of speech energy of said second received signal is greater than the level of speech energy of said first received signal.

20. The communication system of claim 19, wherein said means for handing off further includes means for simultaneously transmitting a second information signal communicated from said other unit via said serving cellsite and on said first channel and via said target cellsite on said second channel.

21. The communication system of claim 20, wherein said means for receiving includes means for receiving said first received signal if said first received signal is an information signal or said second received signal if said second received signal is an information signal.

22. The communication system of claim 20, wherein said means for receiving includes means for selecting said first received signal if the level of speech energy of said first received signal is greater than the level of speech energy of said second received signal or said second received signal if the level of speech energy of said second received signal is greater than the level of speech energy of said second received signal.

23. The communication system of claim 22, wherein said second channel is different than said first channel.

24. The system of claim 23, wherein said system uses an AMPS communication standard.

25. The system controller of claim 23, wherein said system uses an TDMA communication standard.

* * * * *

UNITED STATES PATENT AND TRADEMARK OFFICE
CERTIFICATE OF CORRECTION

PATENT NO. : 5,884,177
DATED : March 16, 1999
INVENTOR(S) : HANLEY, Donald V.

It is certified that error appears in the above-identified patent and that said Letters Patent is hereby corrected as shown below:

```
Claim 1, Col. 9, line 26, change "signaled"
    to --signal--.

Claim 22, Col. 12, line 50 change "second"
    to --first--.
```

Signed and Sealed this

Seventh Day of September, 1999

Attest:

Q. TODD DICKINSON

Attesting Officer

Acting Commissioner of Patents and Trademarks